(12) United States Patent
Zenko et al.

(10) Patent No.: US 6,595,556 B1
(45) Date of Patent: Jul. 22, 2003

(54) CARTRIDGE-TYPE QUICK CONNECTOR

(75) Inventors: Jed W. Zenko, Walworth, WI (US); Duane Eckard, Loves Park, IL (US)

(73) Assignee: Minature Precision Components, Inc., Southfield, MI (US)

( * ) Notice: Subject to any disclaimer, the term of this patent is extended or adjusted under 35 U.S.C. 154(b) by 0 days.

(21) Appl. No.: 10/098,101

(22) Filed: Mar. 14, 2002

(51) Int. Cl.[7] .................................................. F16L 3/08
(52) U.S. Cl. ..................... 285/305; 285/210; 285/140.1
(58) Field of Search ............................. 285/305, 140.1, 285/205, 206, 207, 208, 209, 210, 238

(56) References Cited

U.S. PATENT DOCUMENTS

| | | | |
|---|---|---|---|
| 524,051 A | * | 8/1894 | Walker ........................ 285/210 |
| 608,174 A | * | 8/1898 | Byrnes ........................ 285/210 |
| 1,182,710 A | * | 5/1916 | Rowell ........................ 285/210 |
| 2,461,357 A | * | 2/1949 | Broido et al. ............... 396/533 |
| 2,478,508 A | * | 8/1949 | Simpson ..................... 285/210 |
| 3,326,580 A | * | 6/1967 | Munier ......................... 285/27 |
| 3,679,244 A | * | 7/1972 | Reddy ..................... 403/109.3 |
| 4,531,575 A | * | 7/1985 | Webster ........................ 165/78 |
| 4,588,214 A | | 5/1986 | Guest |
| 4,657,212 A | * | 4/1987 | Gilmore et al. ............... 248/56 |
| 4,844,859 A | * | 7/1989 | Coussau ..................... 376/353 |
| 4,923,220 A | | 5/1990 | Guest et al. |
| 5,085,472 A | | 2/1992 | Guest |
| 5,366,256 A | * | 11/1994 | Pruzin .......................... 285/62 |
| 5,429,396 A | | 7/1995 | Guest |
| 5,603,530 A | | 2/1997 | Guest |
| 5,603,532 A | | 2/1997 | Guest |
| 5,779,284 A | | 7/1998 | Guest |
| 5,806,898 A | | 9/1998 | Hollnagle |
| 5,887,911 A | | 3/1999 | Kargula |
| 5,947,531 A | | 9/1999 | Eckard et al. |
| 5,975,585 A | * | 11/1999 | de la Llave et al. ............ 285/3 |
| 5,975,591 A | | 11/1999 | Guest |
| 6,053,537 A | | 4/2000 | Guest |
| 6,086,118 A | * | 7/2000 | Mc Naughton et al. .... 285/305 |

* cited by examiner

Primary Examiner—Eric K. Nicholson
(74) Attorney, Agent, or Firm—Harness, Dickey & Pierce, P.L.C.

(57) ABSTRACT

A quick connector for establishing a connection between a flexible tube and an interior chamber of a vessel. The vessel has a wall structure through which a mounting bore extends. A canister assembly associated with the quick connector includes a housing is adapted for installation in the mounting bore, a retainer coupled to the housing that adapted to accept and retain a port connector of the hose therein, and a spring clip for coupling the housing to the wall structure. Flanged ends of the spring clip are retained in, and project outwardly from, corresponding apertures formed through a leading end of the housing. Upon installation of the housing into the mounting bore, the end flanges are deflected inwardly until the leading end of the housing extends beyond the mounting bore. Then the flanged ends return to their expanded condition, thereby coupling the canister assembly to the vessel.

29 Claims, 11 Drawing Sheets

CARTRIDGE-TYPE QUICK CONNECTOR

FIELD OF THE INVENTION

The present invention relates generally to quick connectors and, more particularly, to a canister-type quick connector.

BACKGROUND OF THE INVENTION

A type of coupling, commonly referred to as a "quick connector", is used in a wide variety of liquid and gas systems to provide a connection between a pair of components for establishing a continuous flow path therebetween. For example, in automotive applications, quick connectors are used in various air/vapor management systems such as evaporative emissions systems, crankcase ventilation systems, and brake boost and engine vacuum systems. In addition to these gas management systems, quick connectors can also be used in fluid delivery systems such as, for example, liquid fuel and windshield washer applications. The benefits of quick connectors in automotive applications include their ease of assembly and subsequent replacement, a reduction in the number of leak paths, a reduction in the number of system components, and the containment of hydrocarbon emissions.

In many motor vehicle applications, the female connector of a hose assembly is coupled to a male connector port which extends from a wall segment of a vessel-like component (i.e., fuel tank, intake manifold, crankcase, etc.) that delineates an interior chamber from the ambient environment. Unfortunately, the need to form or otherwise secure a male port connector on such structures complicates the fabrication process and tends to increase the packaging space requirements. For example, FIG. 1 illustrates a conventional quick connector arrangement having a hose 10 coupled to a standard male connector port 12 utilizing a quick connector 14 that is generally similar to that described in commonly-owned U.S. Pat. No. 5,947,531. Male connector port 12 is shown extending from a vessel 16 to define a continuous internal flowpath therebetween. Connector 14 includes a housing 18 having a male attachment segment 20 that is shown inserted into the end of hose 10 to provide a sealed connection therebetween. Connector 14 further includes a retainer 22 secured within housing 18 and having a snap-lock mechanism 24 for retaining a rim 26 of male connector port 12 therein.

As an alternative, U.S. Pat. No. 6,053,537 teaches of forming an annular boss on the tank which acts as a raised female receptacle that is adapted to receive the male port segment of either a tube or collect-type connector. The male port segment is retained in the female receptacle via the serrated edges of a spring-loaded grab ring. A cap is required to enclose the raised boss to provide additional rigidity and strength.

Despite the increasing opportunity to use quick connectors in motor vehicle gas management and liquid delivery systems, a need still exists to provide a superior mounting arrangement between one of the male and female connector components, typically the male port connector, and its adjoining wall structure. Ideally, this would be accomplished by providing a standardized mounting arrangement that reduces fabrication complexity and permits modular connection of a wide variety of connectors.

SUMMARY OF THE INVENTION

Accordingly, it is an object of the present invention to overcome the above-noted shortcomings in the quick connector art by providing a canister-type quick connector which can be secured to a wall structure in a flush mount arrangement.

A further object of the present invention is to provide a connection between a wall structure and a canister assembly and which is adapted to accept and retain male port connectors that are connected to a hose assembly or the like.

As a further object of the present invention, the canister assembly includes a housing that is mounted in a stepped bore formed through the wall structure, and a retainer mounted to the housing which has a female receptacle adapted to accept and retain a male connector therein. As a related object, it is contemplated that the canister assembly can include a set of retainers that are each adapted for retention in the housing and which define different sized female receptacles for retention of similarly sized male connectors.

In accordance with one preferred embodiment of the present invention, a quick connector is provided for establishing a continuous flow path between a hose of a flexible-tubing system and an interior chamber of a vessel. The vessel has a wall structure through which a mounting bore extends. A canister assembly associated with the quick connector includes a cylindrical housing adapted for retention in the mounting bore, and a retainer coupled to the housing that defines a female receptacle which is adapted to accept and retain the male port connector of the hose therein. To provide a modular feature, a set of different retainers can be mounted in the housing. Each retainer has a different sized female receptacle that is adapted to receive a similarly-sized male port connector. As such, a common housing/mounting bore interface can be utilized for securing the housing to the wall structure.

In accordance with another unique feature of the present invention, opposing flanged ends of a spring clip are retained in, and project outwardly from, corresponding apertures formed through a leading end of the housing. Upon installation of the leading end of the housing into the mounting bore, the end flanges are resiliently deflected inwardly in response to engagement with the inner wall surface of the mounting bore. Once the leading end of the housing extends beyond the mounting bore, the flanged ends return to their fully expanded condition so as to overlay and engage a portion of the wall structure adjacent the mounting bore within the interior chamber, thereby coupling the housing to the vessel.

Further areas of applicability of the present invention will become apparent from the detailed description provided hereinafter when considered in combination with the appended drawings. It should be understood that the detailed description, while indicating a preferred embodiment of the invention, is only intended to be used for purposes of illustration and that various changes and modifications within the equivalent scope of this invention will become apparent of those skilled in the quick connector art.

DETAILED DESCRIPTION OF THE PREFERRED EMBODIMENT

The present invention relates generally to an arrangement for mounting the female receptacle of a quick disconnector to the wall of a structural component. Upon fixation of the female receptacle to the structural component, a male connector of the quick disconnector can be releaseably secured to the female receptacle to establish a sealed flow path connection between an interior space within the structural component and a hose or conduit secured to the male connector component. It is contemplated that this quick connector and variants thereof can be used to permit flow of liquids and gases through the sealed flow path in virtually any suitable application.

Figure 1:
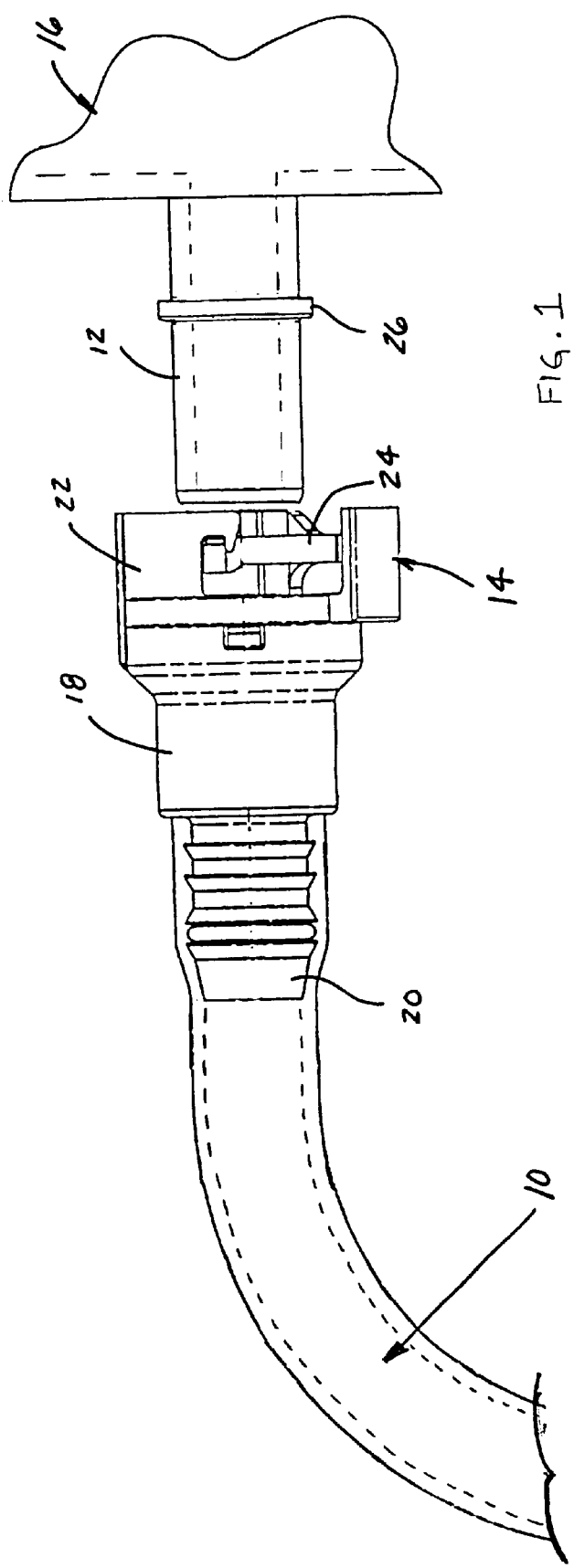
FIG. 1 illustrates the conventional use of a quick connector between a hose and a male port connector of a vessel.
Figure 2:
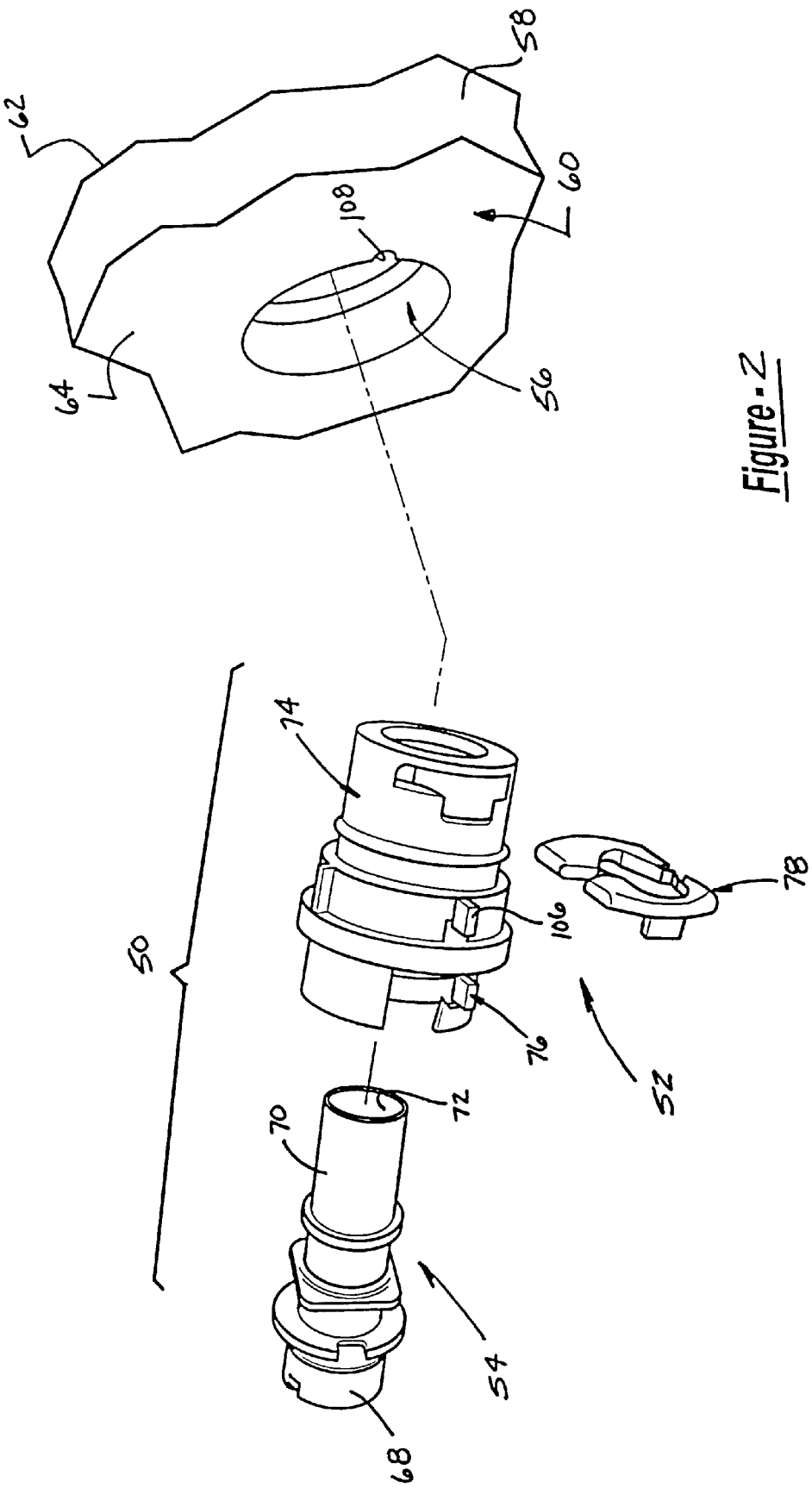
FIG. 2 is an exploded perspective view of a quick connector having a canister assembly according to the present invention.
Figure 3:
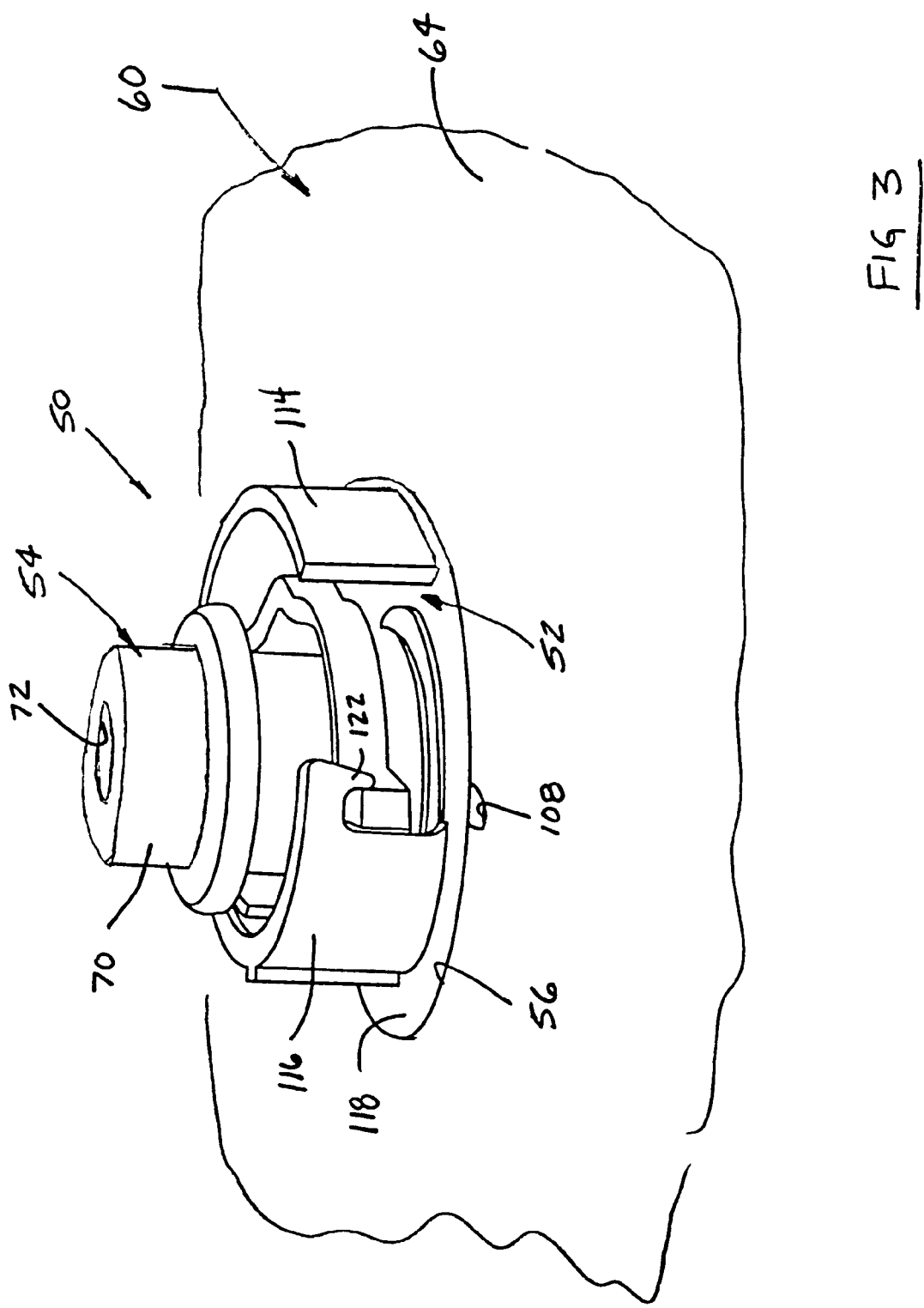
FIG. 3 is an external perspective view of the quick connector with the canister assembly mounted in a wall structure.
Figure 4:
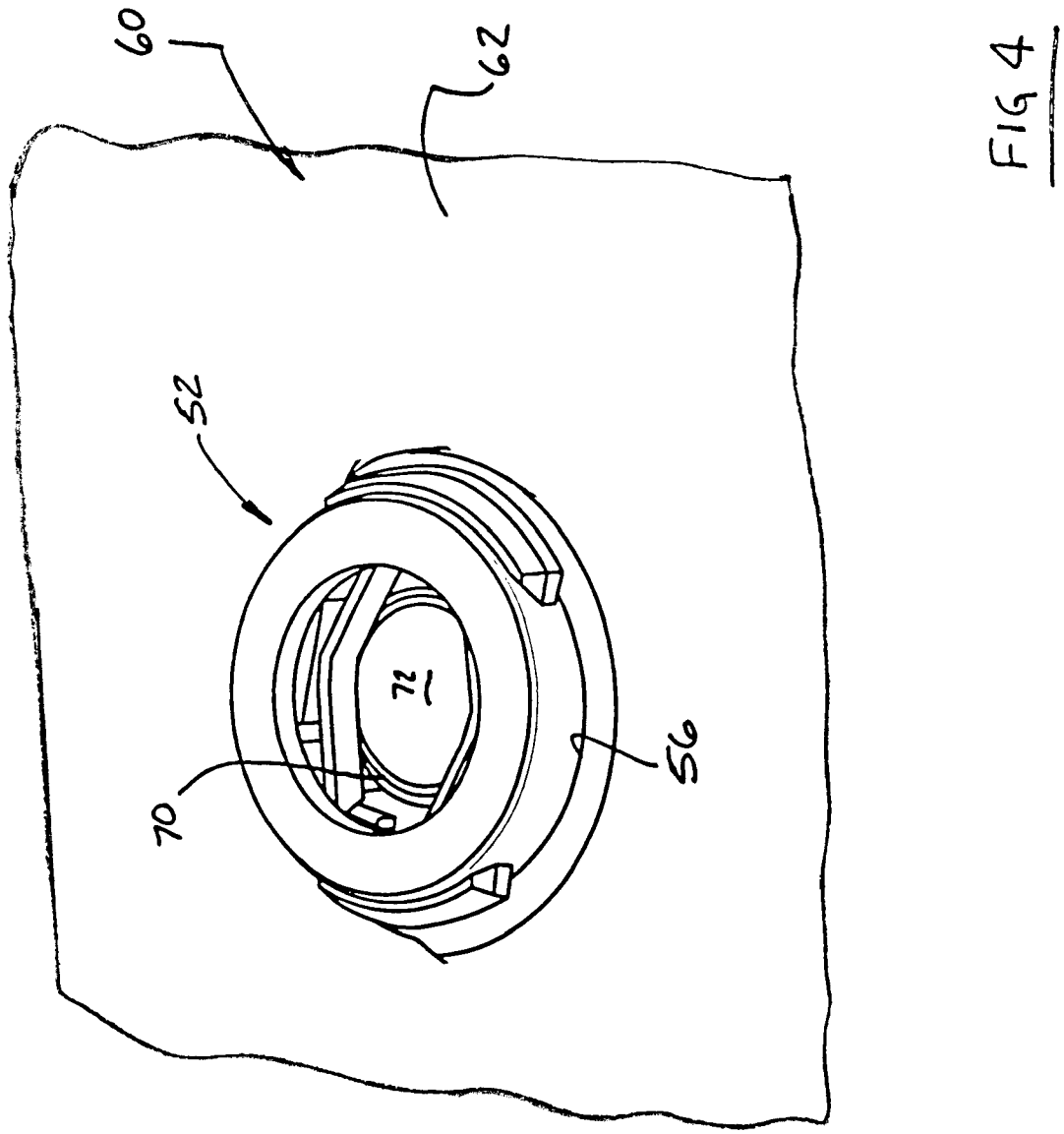
FIG. 4 is an internal perspective view of the quick connector with the canister assembly mounted in the wall structure.
Figure 5:
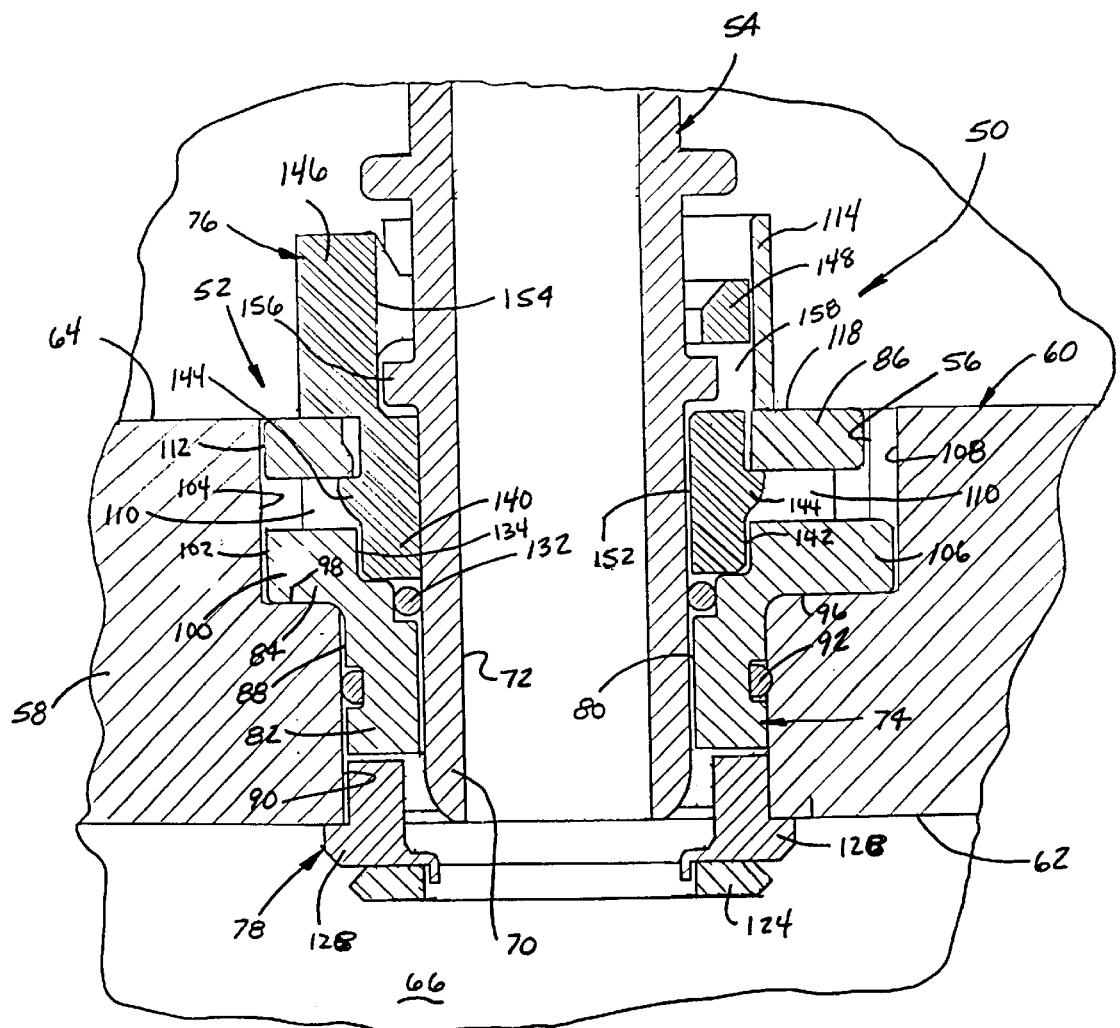
FIG. 5 is a sectional view of the quick connector installed in a stepped mounting bore formed through the wall structure.

Referring now to FIGS. 2 through 12 of the drawings, a coupling apparatus, hereinafter referred to as quick connector 50, is shown to include a canister assembly 52 and a tubular male connector 54. Canister assembly 52 is, as best shown in FIG. 5, adapted for retention in a stepped mounting bore 56 which extends through a wall segment 58 of a structural component 60. In particular, mounting bore 56 extends between an interior wall surface 62 and an external wall surface 64 of wall segment 58 such that canister assembly 52 establishes a flow path with an internal chamber 66 associated with structural component 60. While not specifically shown, male connector 54 has a first end 68 adapted for connection to a flow device such as, for example, a hose, a tube, or the collect of an adjacent quick connector. A second end of male connector 54 defines an end form 70 that is adapted for insertion into canister assembly 52 such that its central flow aperture 72 is in flow communication with internal chamber 66 of structural component 60. Preferably, the size and shape of tubular end form 70 is configured to be in compliance with commercially accepted standards. For example, the Society of Automotive Engineers (SAE) has a set of specifications and recommended practices including SAE J2044 which governs quick connectors used in supply, return and vapor/emission lines for flexible-tubing systems. While not limited thereto, structural component 60 is contemplated to be an enclosed vessel such as, for example, a liquid or gaseous fuel tank, an engine manifold, a washer solution tank, or the like.

Canister assembly 52 includes a housing 74, a retainer 76, and a spring clip 78. Housing 74 is tubular so as to define a central passage 80 and includes a first cylindrical body segment 82, a second cylindrical body segment 84, and a third cylindrical body segment 86. Outer wall surface 88 of first body segment 82 is adapted to be in close proximity to an inner wall surface 90 associated with the lower, smaller diameter portion of stepped mounting bore 56 when canister assembly 52 is mounted therein. In addition, the terminal end portion of first body segment 82 is adapted to extend past interior wall surface 62 of wall segment 58 when canister assembly 52 is installed in stepped bore 56. A seal ring 92 is retained in a groove 94 formed in first body segment 82 to provide a fluid (i.e., liquid and gas) tight seal between housing 74 and structural component 60.

Second body segment 84 has a larger diameter than first body segment 82 so as to define a radial wall surface 96 that engages a shoulder surface 98 of stepped mounting bore 56 when canister assembly 52 is installed therein. A plurality of axial lugs 100 extend outwardly from second body segment 84 of housing 74 and have a circumferential end surface 102 that is adapted to be located in close proximity to an inner wall surface 104 of the upper, larger diameter portion of stepped bore 56 when canister assembly 52 is mounted therein. In addition, a locator lug 106 extends outwardly from second body segment 84 and is adapted for retention in an anti-rotation slot 108 formed in wall segment 58 and which communicates with the upper portion of stepped bore 56. Installation of locator lug 106 in slot 108 prevents housing 74 of canister assembly 52 from rotating relative to wall segment 58.

Figure 6:
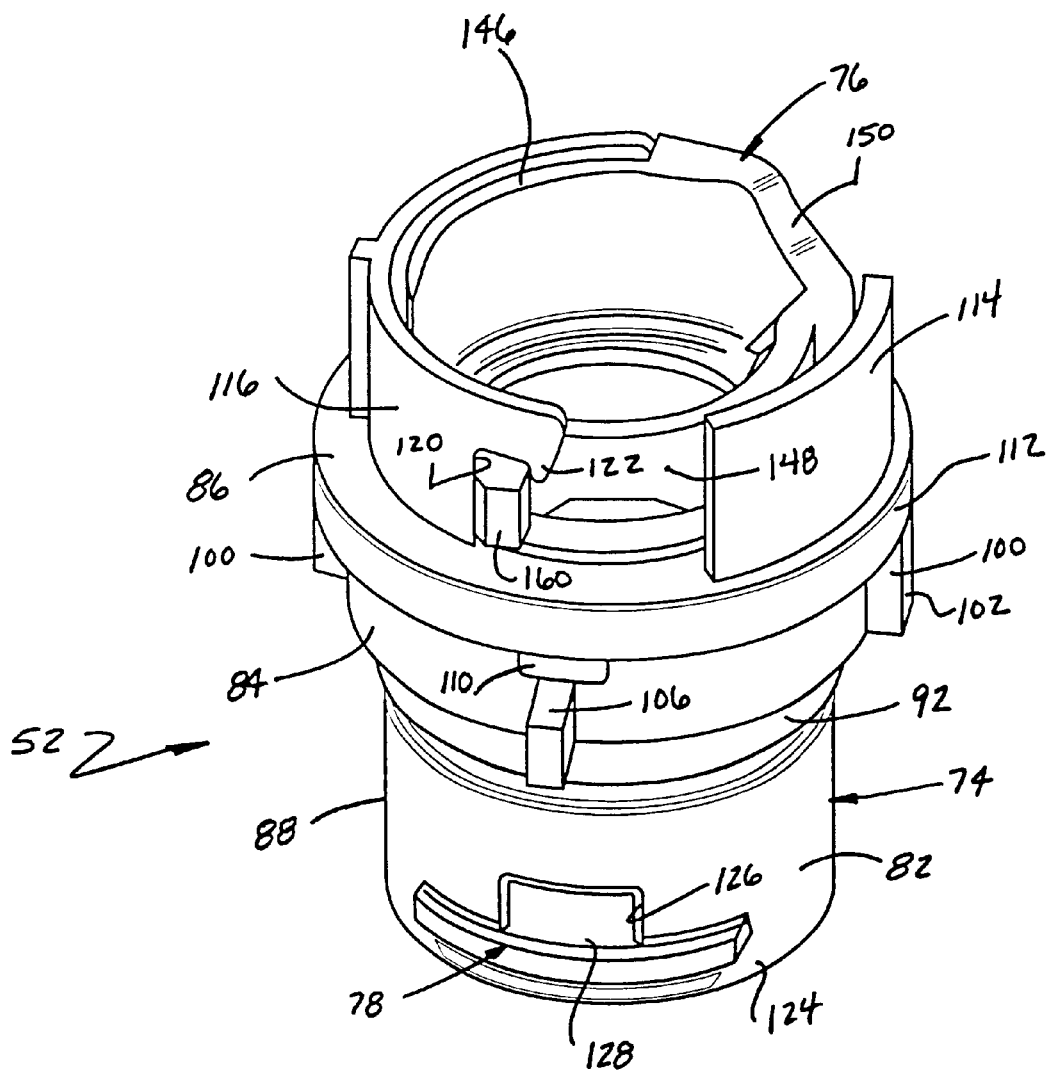
FIG. 6 is a perspective view of the canister assembly associated with the quick connector of the present invention.
Figure 7:
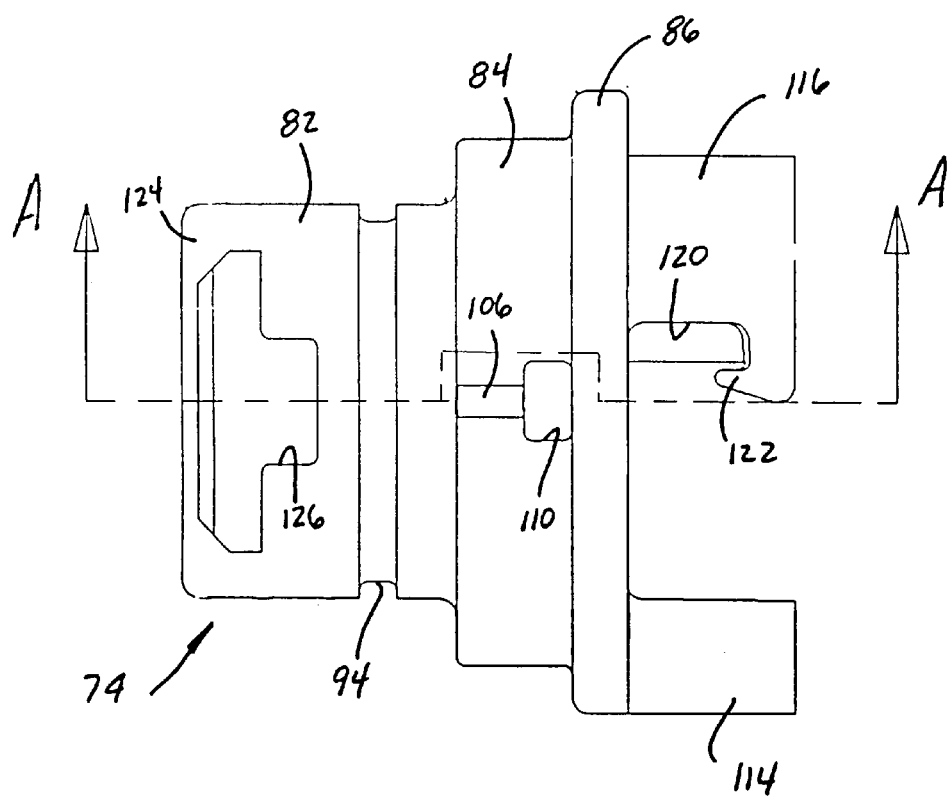
FIG. 7 is a side view of the housing associated with the canister assembly.
Figure 8:
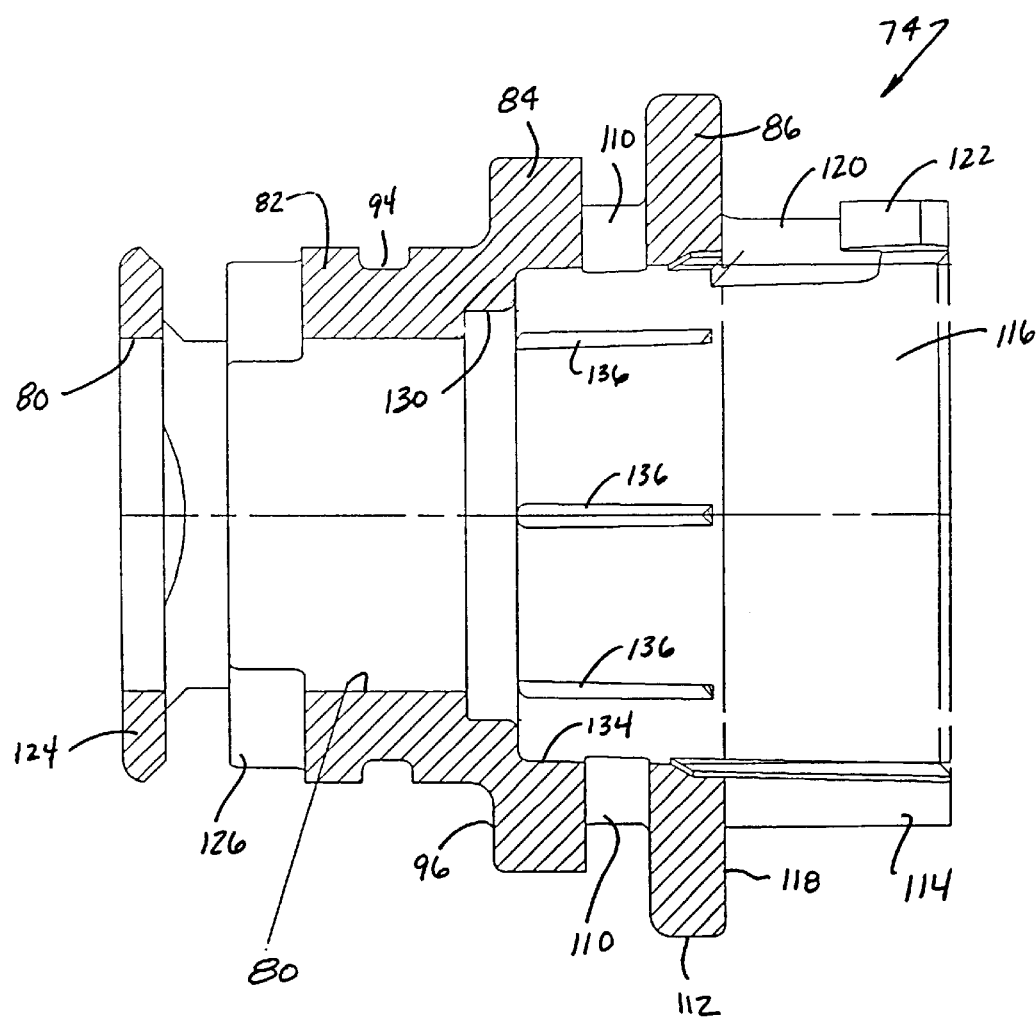
FIG. 8 is a sectional view of the housing taken along line A—A of FIG. 7.
Figure 9:
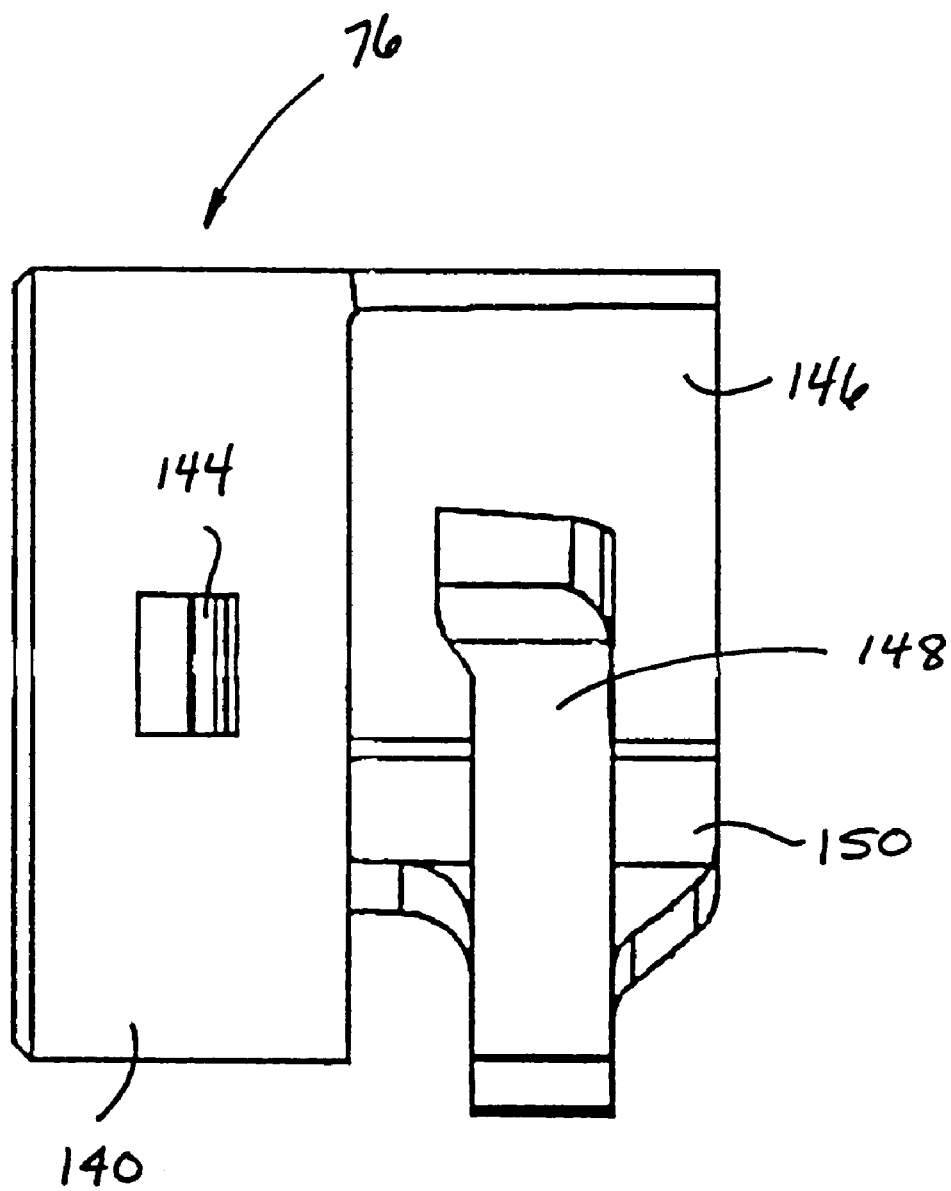
FIG. 9 is a side view of the retainer associated with the canister assembly.

Housing 74 also includes a pair of opposed apertures 110 formed through second body segment 84, with one aperture 110 shown in FIG. 6 to be aligned immediately above locator lug 106. Third body segment 86 of housing 74 is shown to have a larger diameter than second body segment 84 such that its outer circumferential wall surface 112 is adapted to be located in close proximity to inner wall surface 104 of stepped bore 62 when canister assembly 52 is installed therein.

Housing 74 is also shown to include a first arcuate wall segment 114 and a second arcuate wall segment 116, each extending axially from a top radial surface 118 of third body segment 86. Second wall segment 116 has a locking slot 120 and a locking tab 122 formed at its terminal end. As best seen from FIG. 5, top surface 118 of third body segment 86 is adapted to be generally co-planar with exterior surface 64 of structural component 60 when canister assembly 52 is installed in stepped bore 56 to provide a flush mounting arrangement. This flush mounting results in a terminal end 124 of first body segment 82 projecting into chamber 66 such that a pair of cut-out apertures 126 extend into internal chamber 66. Cut-outs 126 are generally T-shaped and are oppositely aligned to extend through terminal end 124 of first body segment 82 so as to communicate with central chamber 80.

As will be detailed, flange portions 128 of spring clip 78 are retained in cut-outs 126 and are adapted to resiliently move from a radially retracted position to radially expanded position during installation of canister assembly 52 into mounting bore 56 so as to engage interior surface 62 of wall segment 58, thereby securing housing 74 of canister assembly 52 to wall segment 58. As best seen from FIG. 8, a groove 130 is formed in central chamber 80 of housing 74 within which a seal ring 132 is retained to provide a sealed interface between housing 74 and end form 70 of male connector 54. In addition, an internal cavity 134 extends through second body segment 84 and third body segment 86 of housing 74 and is sized to receive retainer 76 therein. Longitudinal gripping ridges 136 are formed in cavity 134 and function to resist rotational movement of retainer 76 relative to housing 74 following installation of retainer 76 in cavity 134.

Retainer 76 is shown to include a cylindrical body segment 140 having an outer wall surface 142 adapted to be located in close proximity to an inner wall surface associated with internal cavity 134 in housing 74. A pair of tapered locking tabs 144 extend outwardly from wall surface 142 of retainer body segment 140 and are adapted to be retained in a snap-lock manner within apertures 110 formed in second body segment 84 of housing 74 so as to prevent unintended axial separation of retainer 76 from housing 74. Retainer 76 also includes a circumferential wall segment 146 which extends axially from body segment 140 and is located in close proximity to, and inboard of, arcuate wall segment 116 of housing 74. A cantilevered spring arm 148 extends from a central thicker wall segment 150 from which wall segment 146 also extends. Wall segments 146 and 150 are radially offset relative to body segment 140 so as to define a lower inner wall surface 152 that has a diameter which is less than the diameter of an upper inner wall surface 154. As best seen from FIG. 5, lower wall surface 152 is sized to permit end form 70 of male connector 54 to pass therethrough and be generally coaxial with central passage 80 of housing 74. However, a radial retention rim 156 extending from end form 70 is sized to cause spring arm 148 to resiliently deflect in a radially outward direction upon insertion of end form 70 into retainer 76. Continued insertion of male connector 54 causes rim 156 on end form 70 to disengage spring arm 148 and to be located in an annular retention chamber 158 defined between body segment 140 and an underside segment of spring arm 148. Thereafter, spring arm 148 automatically returns to its non-deflected condition so as to overlay rim 156, thereby preventing unintended axial extraction of end form 70 from retained 76. In this manner, male connector 54 is snap-locked to canister assembly 52. Spring arm 148 has a lug 160 formed at its terminal end which is located within slot 120. Lug 160 is retained in slot 122 by locking tab 122 to prevent radial deflection of spring arm 148.

When it is desired to remove male connector 54 from canister assembly 52, locking tab 160 is released from locking slot 120 to permit radial outward deflection of spring arm 148 sufficient to permit retention rim 156 to be withdrawn from chamber 158. This snap-lock feature only permits intentional release of male connector 54 from canister assembly 52. This feature also permits installation of different types of male connectors 54 each having a similarly sized end form 72 into canister assembly 52. In addition, retainer 76 can be removed from housing 74 by deflecting tapered lock tabs 144 inwardly to release them from retention in apertures 110.

Prior to installation of canister assembly 52 into mounting bore 56, spring clip 78 is slid into cut-outs 126 in housing 74 such that a chamfered edge portion 160 of each flange 128 extends slightly past outer wall surface 88 of first body segment 82. Upon installation of canister assembly 52 into bore 56, edge portions 160 of both flanges 128 engage inner wall surface 90 of mounting bore 56 and are resiliently deflected radially inwardly to permit first body segment 82 of housing 74 to pass through mounting bore 56. Once terminal end 124 of housing 74 extends beyond inner surface 62 of wall segment 58, and underside surface 96 of second body segment 84 is seated on shoulder surface 98 of mounting bore 56, flanges 128 snap back to their non-deflected position such that edge portions 160 overlay surface 62 of wall segment 58. As such, spring clip 78 functions to retain housing 74 in mounting bore 56.

Figures 10, 11:
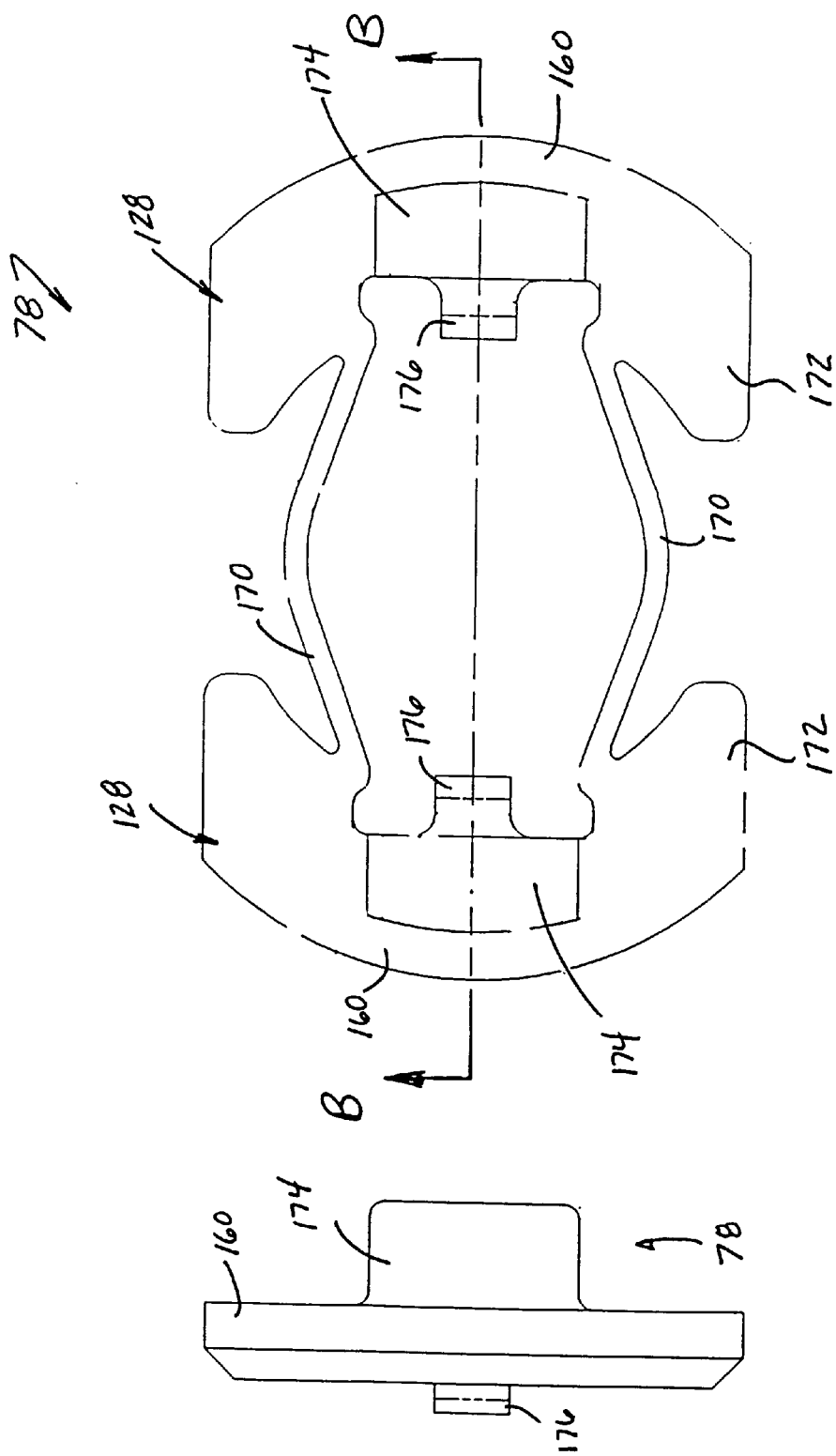
FIG. 10 is a top view of the spring clip associated with the canister assembly.
FIG. 11 is an end view of the spring clip shown in FIG. 10.
Figure 12:
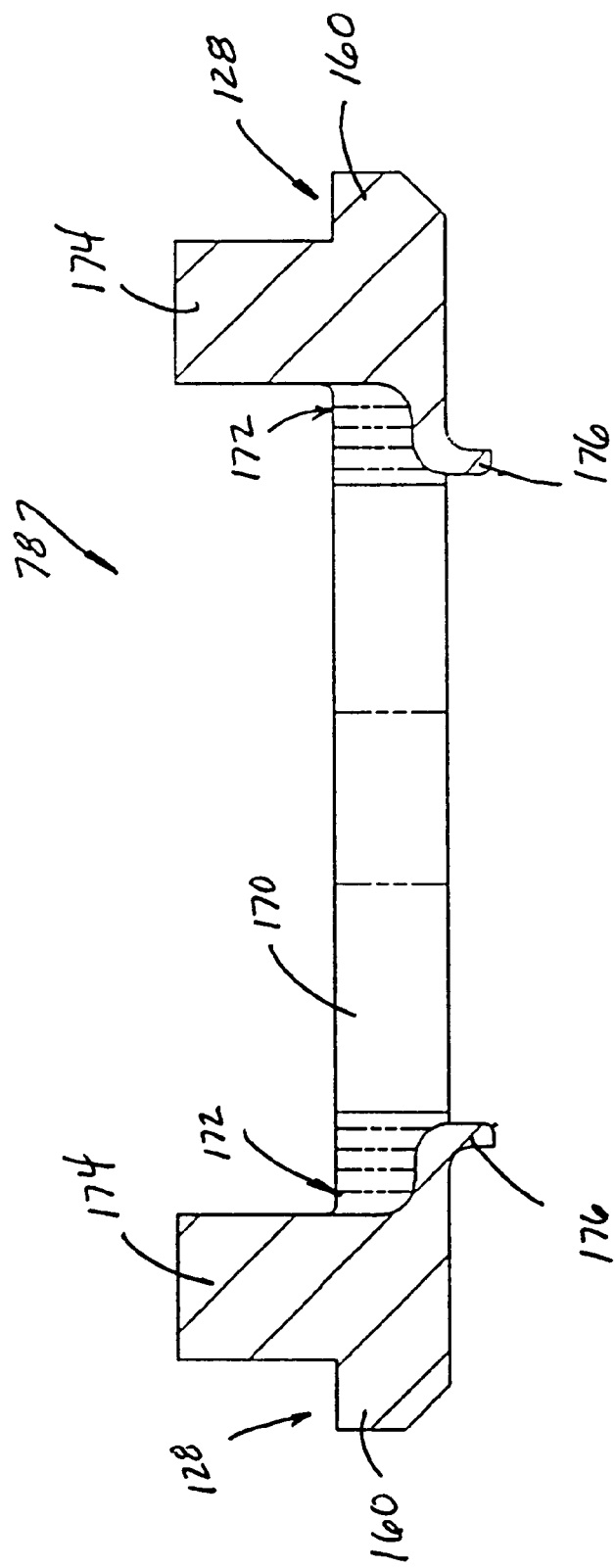
FIG. 12 is a sectional view of the spring clip taken along line B—B of FIG. 10.

Referring primarily to FIGS. 10 through 12, spring clip 78 is shown flanges 128 interconnected by a pair of leaf springs 170. Each flange 128 includes a plate segment 172 to which opposite ends of leaf springs 170 are attached. Each flange 128 also includes an upstanding lug 174 that is formed centrally on each plate segment 172 and is retained in an upstanding portion of a corresponding cut-out 126. Similarly, end portions 160 extend from, and form part of, plate segments 172 and are retained in corresponding portions of apertures 126. Spring clip 78 also includes a pair of retention lugs 176 which extend downwardly from an inner edge of plate segments 172. Retention lugs 176 are oriented to seat against wall surface 80 near terminal end 124 adjacent their interface with apertures 126 so as to prevent dislodgement of spring clip 78 from housing 74 prior to installation of canister assembly 52 into mounting bore 56. Thus, canister assembly 52 can be preassembled prior to installation into mounting bore 56.

Leaf springs 170 normally maintain plate segments 172 at a predefined lateral offset relative to one another, thereby defining an expanded condition for spring clip 78. However, engagement of edge portions 160 of plate segments 172 with wall surface 90 of mounting bore 56 causes leaf springs 170 to deflect, thereby causing inward movement of flanges 128 such that spring clip 78 is considered in a retracted condition. With spring clip 78 in its expanded condition, lugs 176 are biased into contact with the shoulder surface defined between apertures 126 and inner surface 80 to retain spring clip 78 in housing 74. During assembly of canister assembly 52 into mounting bore 56, leaf springs 170 deflect such that spring clip 78 moves from its extended condition to its retracted condition. Once canister assembly 52 is completely installed in mounting bore 56, leaf springs 170 are free to expand such that, spring clip 78 automatically springs back to its extended condition, thereby causing end portions 160 to extend out of apertures 126 and extend past inner surface 80 to overlie interior surface 62 of wall segment 58.

One of improvement provided by the present invention is the ability to adopt a standardized mounting bore size that accepts a common sized canister assembly. This method of pre-installing a canister-type female socket into a stepped bore to define a generally flush mount arrangement significantly reduces the cost and complexity of dies/molds and secondary machining previously required to form integral male connectors or connector bosses. Also, different retainers having a common outer diameter and differing inner diameters can be snap-locked into a common housing to accommodate different sized male connector end forms. This modularity feature will permit a significant reduction in the number and type of quick connector components required to interconnect differently sized flow devices.

Those skilled in the art will under the significant advantages and benefits afforded by the canister-type quick connector of the present invention. While a preferred application of the present invention is directed to motor vehicle liquid (i.e., fuel, washer solvent, etc.) and gaseous (i.e., air, vapor, emissions, etc.) systems, it is to be understood that the canister-type mounting feature of the invention is intended to cover all suitable quick connector applications. However, it is contemplated that other types of quick connectors not shown but subsequently acknowledged as equivalent in structure and function to that shown and utilizing the mounting and retention system of the present invention are within the fair and reasonable scope of this invention.

What is claimed is:

1. A connector for connecting a hose to a wall structure to define a flow path between the hose and a chamber defined by the wall structure, comprising:

a housing mounted in a bore formed through the wall structure such that its first end extends into the chamber;

a spring clip retained in apertures formed in said first end of said housing, said spring clip having end portions extending outwardly from said apertures that are adapted to prevent removal of said housing from the mounting bore;

a retainer secured to a second end of said housing and defining a female receptacle in communication with the chamber; and a male connector having a first end secured to the hose and a second end adapted for retention in said female receptacle of said retainer.

2. The connector of claim 1, wherein said spring clip further includes at least one leaf spring interconnecting said end portions so as to permit resilient movement of said end portions between a retracted position and an expanded position.

3. The connector of claim 2, wherein said end portions are resiliently deflected from their expanded position to their retracted position in response to installation of said first end of said housing into the bore, and wherein said end portions of said spring clip are permitted to return to their expanded position once said end portions are located in the chamber.

4. The connector of claim 2, wherein said spring clip further includes retention lugs engaging edge surfaces of said apertures for preventing dislodgement of said spring clip from said housing.

5. The connector of claim 1, wherein the bore is formed in the wall structure between an exterior surface and an interior surface which communicates with the chamber, and wherein the bore is stepped to define a larger section which communicates with the exterior surface and a smaller section which communicates with the interior surface, and wherein said first end of said housing includes a first body segment adapted for retention in the smaller section of the stepped bore and said second end of said housing includes a second body segment adapted for retention in the larger section of the stepped bore.

6. The connector of claim 5, wherein said second body segment of said housing defines a cavity within which said retainer is secured.

7. The connector of claim 6, wherein said retainer includes a projection that is adapted to be retained in an aperture formed in said second body segment of said housing to secure said retainer to said housing.

8. The connector of claim 5, wherein an anti-rotation slot is formed in the exterior surface of the wall structure and extends into the larger section of the stepped bore, and wherein said second body segment of said housing includes a locator lug that is retained in said anti-rotation slot to prevent rotation of said housing relative to the wall structure.

9. The connector of claim 5, wherein said retainer includes a cylindrical retainer body segment adapted for retention in said cavity formed in said second body segment of said housing, said retainer further includes a wall segment extending from said retainer body segment, and an arcuate spring arm extending from said wall segment.

10. The connector of claim 9, wherein a retention rim formed on said second end of said male connector is adapted to cause said spring arm to deflect radially outwardly upon insertion into said female receptacle until said retention rim is located in an annular space defined between said spring arm and said retainer body segment, and wherein once said retention rim is located in said annular space, said spring arm returns to its non-deflected position for retaining said rim in said annular space, thereby snap-locking said male connector to said retainer.

11. The connector of claim 10 wherein the wall structure is a fuel tank for a motor vehicle.

12. The connector of claim 10 wherein the wall structure is an engine manifold for a motor vehicle.

13. A method for connecting a hose to a wall structure to define a flow path between the hose and an internal chamber defined by the wall structure, comprising the steps of:

providing a canister assembly including a housing having a first end and a second end, a spring clip having end flanges extending out of apertures formed in said first end of said housing, and a retainer secured to said second end of said housing and defining a female receptacle;

forming a mounting bore through said wall structure between an exterior wall surface and an interior wall surface which communicates with said internal chamber;

inserting said canister assembly into said mounting bore such that said end flanges of said spring clip engage said mounting bore and are resiliently deflected from their normal expanded position to a retracted position within said apertures;

expanding said end flanges of said spring clip from their retracted position to their expanded position when said first end of said housing is located within said internal chamber such that said end flanges project over said interior wall surface of said wall segment;

providing a connector component having a first end connected to said hose and a second end defining a male connector;

inserting said male connector into said female receptacle of said retainer; and securing said male connector in said female receptacle.

14. The method of claim 13 wherein said spring clip includes a leaf spring interconnecting said end flanges and which permits movement thereof between their expanded and retracted positions.

15. The method of claim 13 wherein said step of forming a mounting bore further includes forming a stepped mounting bore having a smaller bore segment in communication with said interior wall surface and a larger bore segment between said smaller bore segment and said external wall surface, said smaller bore segment sized to engage and resiliently deflect said end flanges of said spring clip from their expanded position to their retracted position upon insertion of said first end of said housing into said smaller bore segment.

16. The method of claim 15 wherein said first end of said housing includes a first cylindrical body segment sized for retention in said smaller bore segment of said mounting bore, and said second end of said housing includes a second cylindrical body segment sized for retention in said larger bore segment of said segment mounting bore.

17. The method of claim 16 further including the steps of providing a cavity in said second body segment of said housing sized to accept a body segment of said retainer therein, and providing a snap-locking connection between said second body segment of said housing and said body segment of said retainer.

18. The method of claim 13 wherein said step of securing said male connector within said female receptacle of said retainer includes providing a snap-lock coupling therebetween.

19. The method of claim 13 wherein said wall structure is a fuel tank for a motor vehicle.

20. The method of claim 13 wherein said wall structure is an engine manifold for a motor vehicle.

21. A connector for connecting a hose to a wall structure to define a flow path between the hose and an interior chamber defined by the wall structure, comprising:

a housing having a central flow passage and first and second ends, said housing is adapted to be mounted in a bore formed through the wall structure such that its first end extends into the interior chamber;

a spring clip retained in apertures formed in said first end of said housing, said spring clip having end flanges extending outwardly from said apertures that are adapted to prevent removal of said housing from the bore; and a male connector having a first end secured to the hose and a second end adapted for retention in a female receptacle associated with said second end of said housing.

22. The connector of claim 21, wherein said spring clip further includes a pair of leaf springs interconnecting said end flanges so as to permit resilient movement of said end flanges between a retracted position and an expanded position.

23. The connector of claim 22, wherein said end flanges are resiliently deflected from their expanded position to their retracted position in response to installation of said first end of said housing into the bore, and wherein said end flanges of said spring clip are permitted to return to their expanded position once said end flanges are located within the interior chamber.

24. The connector of claim 22, wherein said spring clip further includes retention lugs for engaging edge surfaces of said apertures for preventing dislodgement of said spring clip from said housing.

25. The connector of claim 21, wherein the bore is formed in the wall structure between an exterior surface and an interior surface which communicates with the interior chamber, wherein the bore is stepped to define a larger section in communication with the exterior surface and a smaller section in communication with the interior surface, and wherein said first end of said housing includes a first body segment adapted for retention in the smaller section of the stepped bore and said second end of said housing includes a second body segment adapted for retention in the larger section of the stepped bore.

26. The connector of claim 25, wherein said second body segment of said housing defines a cavity within which a retainer is secured, said retainer defining said female receptacle.

27. The connector of claim 26, wherein said retainer includes a projection that is adapted to be retained in an aperture formed in said second body segment of said housing to secure said retainer to said housing.

28. The connector of claim 26, wherein said retainer includes a cylindrical retainer body segment adapted for retention in said cavity formed in said second body segment of said housing, a wall segment extending from said retainer body segment, and an acurate spring arm extending from said wall segment.

29. The connector of claim 28, wherein a rim formed in said second end of said male connector is adapted to cause said spring arm to radially outwardly deflect upon insertion into said female receptacle until said rim is located in an annular space between said spring arm and said retainer body segment, and wherein said spring arm is thereafter released and returns to its non-deflected position for retaining said rim in said annular space, thereby snap-locking said male connector to said retainer.

* * * * *